No. 815,017. PATENTED MAR. 13, 1906.
G. E. HOLLIDAY.
GRAIN SEPARATOR.
APPLICATION FILED JULY 29, 1905.
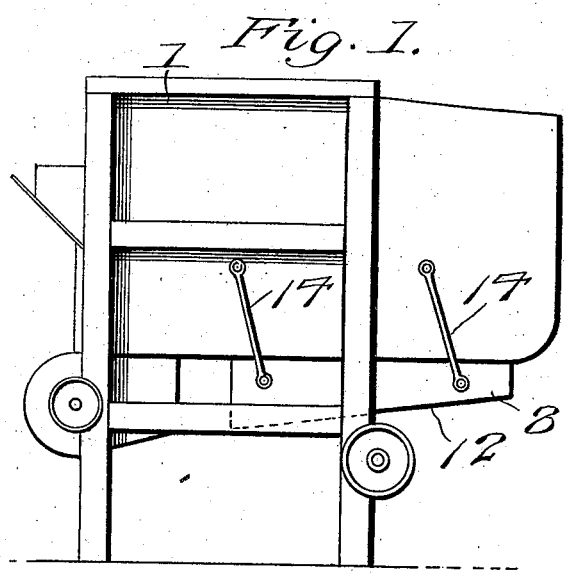
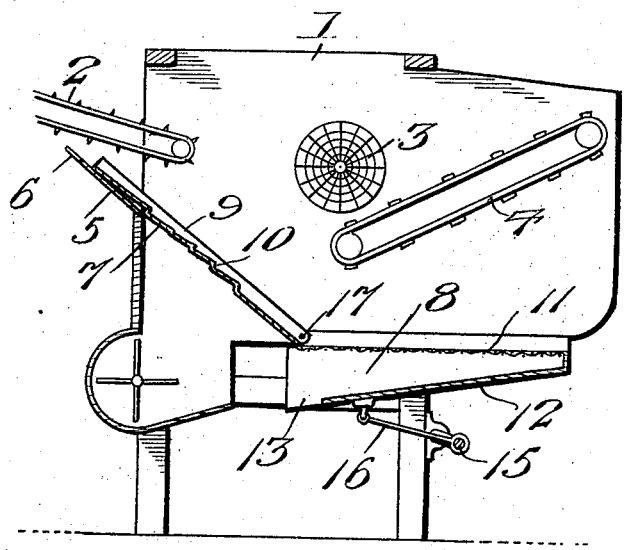

UNITED STATES PATENT OFFICE.

GEORGE E. HOLLIDAY, OF ROCK RAPIDS, IOWA.

GRAIN-SEPARATOR.

No. 815,017.
Specification of Letters Patent.
Patented March 13, 1906.

Application filed July 29, 1905. Serial No. 271,720.

*To all whom it may concern:*

Be it known that I, GEORGE E. HOLLIDAY, a citizen of the United States of America, residing at Rock Rapids, in the county of Lyon and State of Iowa, have invented new and useful Improvements in Grain-Separators, of which the following is a specification.

This invention relates to improvements in separators for corn-shellers of that type wherein the shelled grain is fed to a shaking-shoe or its equivalent for separating the grain from the chaff or refuse.

Heretofore it has been customary to employ a stationary guide plate or chute beneath the delivery end of the feeder and adjacent to or below the shelling mechanism to guide the shelled grain to the shoe or other screening means or to an outlet. The disadvantage of using such a fixed guide-plate is that the grain frequently becomes clogged and obstructs the sheller.

The object of my invention is to provide a guide or conductor plate which overcomes this objection and is adapted for use upon shellers operating with or without a shoe.

In the accompanying drawings, Figure 1 is a side elevation of a sheller embodying my invention, showing only so much of the shelling mechanism as is necessary to a full disclosure of the invention. Fig. 2 is a vertical longitudinal section of the same. Fig. 3 is a detail section showing a modification.

Referring now more particularly to the drawings, the numeral 1 denotes the sheller frame or casing; 2, the feeder, consisting of the usual endless belt or apron; 3, the shelling mechanism, and 4 the cob-conveyer, all of which may be of any of the constructions in common use.

Secured to the frame below the delivery end of the conveyer is a supporting-plate 5, provided at its upper or free edge with notches 6 for the free passage of the lugs or projecting fingers on the conveyer. This plate slidably supports the upper end of an inclined guide plate or chute 7, which extends at a downward inclination therefrom to the shoe or shaking-screen 8, which latter is disposed below the shelling mechanism and receiving end of the cob-conveyer 4. The plate 7 is provided with side guard-flanges 9 to prevent the escape of grain from the sides thereof, thus forming, in effect, a grain-delivery pan. The intermediate surface of the plate is also transversely corrugated to provide a series of steps or projections 10 to shake up and turn over the grain passing therefrom by gravity to the shoe 8, so that the grain will be delivered to the shoe in a spread or loosened-up condition.

The shoe 8 may be of any ordinary construction and, as shown, in the present instance comprises a horizontally-reciprocating box open at its upper side to receive the grain and provided with a screen 11. The forward end of the box is closed, and the bottom wall 12 thereof is downwardly and rearwardly inclined and cut away at its rear end to form an outlet 13 for the discharge of the screened grain. The shoe is supported from the frame by pivoted suspending hangers or links 14 and receives motion from a suitably-driven crank-shaft 15 through the medium of connecting-rods 16. The guide-plate 7 is pivotally attached at its lower end, as shown at 17, to the inner end of the shoe, so as to move therewith. By this construction the shoe when reciprocated imparts a reciprocating and tilting motion to the guide-plate 7, and as the grain feeds downward over the surface of said plate it is loosened up and unobstructedly fed forward to the screen and choking of the sheller by the undue accumulation of grain effectually prevented.

The guide-plate may be applied to shellers operating without a shoe by simply providing a different arrangement of operating mechanism, as shown in Fig. 3. In this figure I have shown an operating-shaft disposed beneath and in rear of the plate, said shaft 18 having cranks to which are attached connecting-rods 19, jointed to the lower end of the plate. Any ordinary equivalent construction of operating mechanism may be substituted for this type of operating mechanism—such, for instance, as an eccentric suitably connected with the plate; or any known construction of knocker mechanism may be employed.

Having thus described my invention, what I claim is—

1. In a corn-sheller, a shaking-shoe, a guide-plate slidably supported at its upper end, and means for connecting the lower end of said plate with the shoe to impart reciprocatory and tilting motion to said plate when the shoe is reciprocated.

2. In a corn-sheller, a frame, a stationary supporting member on the frame, an inclined grain-delivery plate slidably supported at its upper end by said supporting member, and means for imparting sliding and tilting motion to said plate.

3. In a corn-sheller, a frame, a feeder, an inclined guide and supporting plate carried by the frame and provided with notches to permit passage of the feeder, an inclined grain-delivery pan slidably supported at its upper end by said plate, and means pivotally connected with the lower end of the pan for imparting a sliding and tilting motion thereto.

4. In a corn-sheller, a frame, a corn-conveyer, and shelling mechanism, in combination with an inclined supporting-plate arranged below the delivery end of the conveyer, an inclined grain-delivery plate or pan slidably supported at its upper end by said plate and having its lower end arranged below the shelling mechanism, and means pivotally connected with the lower end of the pan to impart a sliding and tilting motion thereto.

In testimony whereof I affix my signature in presence of two witnesses.

GEORGE E. HOLLIDAY.

Witnesses:
HANS H. PRAHL,
SIMON FISHER.